United States Patent [19]

Donlon et al.

[11] 3,712,240
[45] Jan. 23, 1973

[54] LINEAR ELECTRIC MOTOR PROPULSION SYSTEM

[75] Inventors: Richard H. Donlon, Littleton; William R. Hamilton, Aurora, both of Colo.

[73] Assignee: Transportation Technology, Inc., Denver, Colo.

[22] Filed: Feb. 23, 1971

[21] Appl. No.: 117,999

[52] U.S. Cl. .............................. 104/148 LM, 310/13
[51] Int. Cl. ......... B60l 9/16, B60l 11/00, B60l 13/00
[58] Field of Search ... 104/148 LM, 148 MS; 310/12, 310/13; 318/135

[56] References Cited

UNITED STATES PATENTS 3,233,559   2/1966   Smith et al ..................... 104/148 LM
2,640,955   6/1953   Fisher ................................ 318/135

*Primary Examiner*—Gerald M. Forlenza
*Assistant Examiner*—George H. Libman
*Attorney*—McGlynn, Reising, Milton & Ethington

[57] ABSTRACT

A linear motor propulsion system for vehicles adapted to travel along a fixed roadway comprising primary and secondary motor elements, one of which is carried by the vehicle and the other of which is disposed in a discontinuous fashion along the roadway. A constant thrust profile is achieved by arranging the length and spacing of the elements such that a constant area of projected surface coextension exists between the elements irrespective of the vehicle position along the roadway.

8 Claims, 3 Drawing Figures

PATENTED JAN 23 1973

3,712,240

INVENTORS
Richard H. Donlon &
BY William R. Hamilton

Barnard, McGlynn & Reising
ATTORNEYS

LINEAR ELECTRIC MOTOR PROPULSION SYSTEM

This invention relates to vehicular propulsion by linear electric motors and particularly to the achievement of a substantially constant thrust profile using discontinuous motor elements.

It is now well known that the linear induction motor may be employed for the propulsion of vehicles along fixed roadways. The initial applications of linear induction motors to vehicular propulsion were in rail vehicles similar to conventional trolley or train cars. More recently linear electric motors have been proposed for the propulsion of vehicles which are supported relative to a fixed roadway by means of a low-pressure air cushion which reduces friction between the vehicle and the roadway to the point of negligibility.

As is well known to those familiar with electric motors, the linear electric motor comprises a field producing element, normally called a primary, and a field reactive element, normally called a secondary. It is customary for one or the other of these elements to be discontinuously arrayed along the roadway to save material and installation expense. In such a design the propelled vehicle actually experiences an intermittent thrust profile, a thrust pulse being applied as the vehicle passes over each of the intermittent motor elements. This intermittent thrust profile may be transmitted through the motor carriage to the vehicle frame and be disturbing in varying amounts to the passengers. Some degree of mitigation can be accomplished by resilient motor mounting as well as by arranging the intermittent elements closely together so that at speed the thrust pulses are closely spaced in time.

In accordance with the present invention the thrust profile of a linear electric motor propulsion system having at least one intermittent motor element is caused to be substantially constant by designing the length of one element and the spacing between the other discontinuous elements to be such that the area of motor elements overlying one another, that is, being in projected surface coextension, is constant irrespective of the position of the vehicle relative to the roadway.

In the preferred form, the element disposed on the vehicle, either primary or secondary, is of such length as to be equal to the spacing between the centerlines of two of the discontinuous element portions in the roadway. Accordingly, movement of the vehicle along the roadway causes a constant area of projected surface coextension between the vehicle mounted and roadway motor elements. Since the thrust experienced by the vehicle is a function of the overlying motor areas and these overlying motor areas are constant with respect to time at least over a portion of the roadway, the vehicle experiences a relatively constant thrust profile. It is to be understood, of course, that the spacing between the discontinuous motor elements may be varied over different portions of any given roadway and, therefore, that the principles of the subject invention may be applied selectively to a given portion of a roadway.

The various features and advantages of the invention will become more apparent from a reading of the following specification which describes illustrative embodiments of the invention in detail. The specification is to be taken with the accompanying drawing of which:

Figure 1:
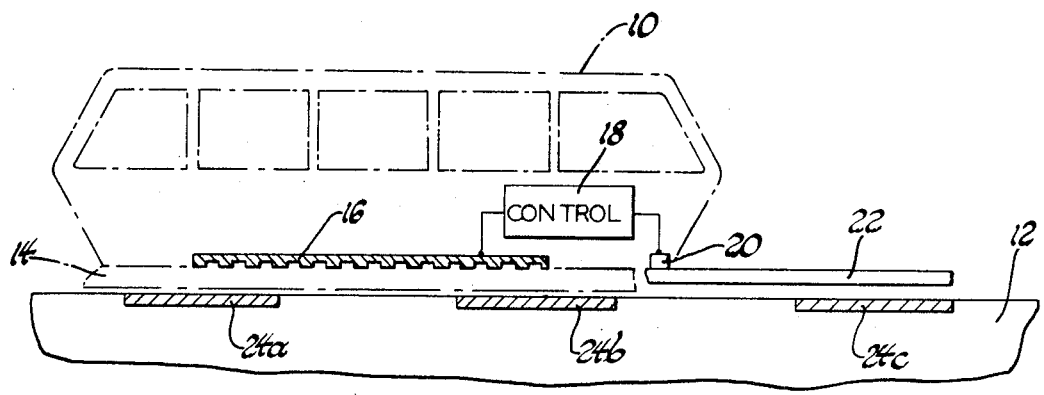
FIG. 1 is a schematic view of a first embodiment of the invention.

Referring now to FIG. 1, there is shown a mass transit vehicle 10 which is adapted to travel over and along a fixed roadway 12 on a low-pressure air cushion provided by an air pad 14 of a conventional type. Roadway 12, while not described or illustrated in detail, is preferably of the guideway type having at least two angled support surfaces to provide both vertical and lateral support for the vehicle 10. Such roadways are known in the prior art.

Vehicle 10 is propelled and preferably braked by means of a linear electric motor having a field producing primary element 16 of the distributed winding type mounted on the vehicle so as to be adjacent but slightly spaced from the surface of the roadway 12. Alternating current is supplied to the field winding of the primary element 16 through a control unit 18 which is preferably of the type employing rheostats and phase shifting circuitry subject to automatic or manual control. The input to control unit 18 is provided by a brush contact 20 which is disposed on the exterior of the vehicle 10 and which rides on a third rail conductor 22 which extends continuously along the roadway 12. Other types of power input devices may, of course, be employed, as for examples, a trolley or self-contained power source.

The primary motor element 16 provides thrust for the vehicle 10 by cooperating with the field reactive secondary element 24 which is distributed along the roadway 12 in discontinuous portion a, b, and c. The secondary portions 24a, 24b, and 24c may, for example, be aluminum plates permanently disposed in a concrete or asphalt base and, over the portion of the roadway 12 shown in FIG. 1, are placed at regular intervals of equal length such that a constant distance exists between the center lines of the secondary element portions.

Figure 3:
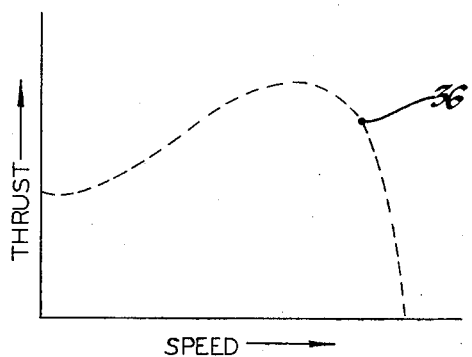
FIG. 3 is a speed-thrust characteristic for a linear induction motor.

As illustrated in FIG. 1, the length of the field producing primary 16 is equal to the distance between the centerlines of the adjacent field reactive secondary element portions 24a and 24b. Accordingly, as the vehicle 10 advances to the left the primary element 16 shades more of the secondary element portion 24a and less of the secondary element portion 24b. The reverse is, of course, true as vehicle 10 advances to the right as shown in FIG. 1. As a result the projected surface coextension or shaded area between the primary and secondary elements 16 and 24, respectively, is constant as the vehicle 10 progresses along the roadway 12. This constant shaded area gives rise to a constant thrust with little or no discontinuity or intermittent character even though the secondary 24 is discontinuously placed along the roadway 12. The same effect is achieved if the primary element 16 is made equal in length to the distance between centerlines of any two regularly spaced portions of element 24, whether such portions be adjacent or separated by one or more other portions. The linear electric motor is preferably operated in the speed range to the right of point 36 in the diagram of FIG. 3. In this range it can be seen that a decrease in speed caused by increased load on the motor moves the motor operating characteristic upwardly on the trust curve producing an immediate correction and a restoration of normal operating speed.

As will be apparent to those skilled in the motor art, the primary element 16 and secondary element 24 may be interchanged in relative position as shown in FIG. 1. The secondary may accordingly be placed on the vehicle 10 in place of the primary element 16 and the roadway 12 may be equipped with a discontinuous series of field-producing primary elements. This eliminates the need for the third rail conductor 22, an arrangement which may be preferably for short run operations. The aforementioned constant thrust profile is again achieved by fabricating the vehicle mounted secondary to be of such length as to be equal to the spacing between centerlines of regularly spaced roadway mounted primary elements.

Figure 2:
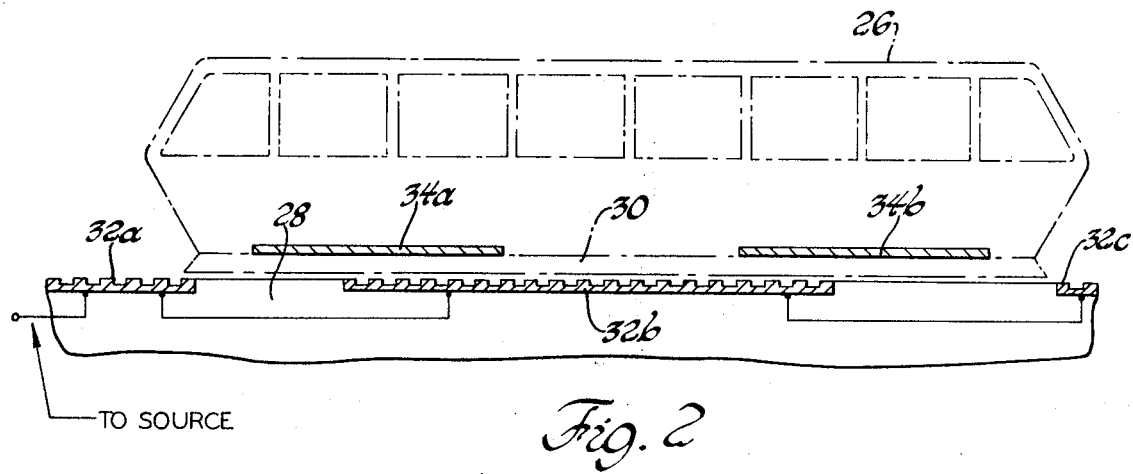
FIG. 2 is a schematic view of a second embodiment of the invention.

Referring now to FIG. 2, another embodiment of the invention is shown wherein the vehicle 26 is adapted to carry a two-part secondary element 34 having portions a and b and the roadway 28 is provided with a discontinuous primary element 32 having portions a, b, and c. In FIG. 2, the vehicle 26, which is illustrated as being larger than the vehicle 10 of FIG. 1, is supported relative to a fixed guideway-type roadway 28 by means of the air pad 30. The field producing primary element portions 32a, 32b, and 32c are interconnected with an alternating current power source, as indicated, and are of equal length and regular spacing. The secondary element portions 34a and 34b are again aluminum plates of equal width, thickness, and length and are spaced such that the overall length of the element 34, including the space between, is equal to the distance between centerlines of element portions 32.

To achieve the constant thrust profile, previously described, the primary element portion 32b is of such length as to be equal to the distance between centerlines of the secondary elements 34a and 34b. Thus, as the vehicle 26 moves either left or right along the roadway 28 a constant area of projected surface coextension as between the primary and secondary elements 32 and 34, respectively, is achieved. Again, the primary and secondary element identities in the arrangement of FIG. 2 may be reversed; that is, the primary elements may be disposed on the vehicle in the two-part discontinuous fashion illustrated for the secondary portions 34a and 34b and the illustrated primary element 32 may be interchanged with aluminum plates to act as secondary elements. In such an arrangement, either a vehicle carried power generator or an external pickup arrangement is required.

Although the invention has been described as being applied exclusively to air-supported vehicles 10 and 26, it is to be understood that other types of support means such as steel wheels and rubber tires may be employed, the principles of electric motor propulsion being the same irrespective of the support means type. Moreover, the linear motors may be mounted such that the air gap between primary and secondary is vertical rather than horizontal as shown, or at some intermediate angle. Such nonhorizontal motors may straddle a rail or coact with guideway wall elements. These modifications are not exhaustive of the possibilities. Therefore, the illustrative explanations given above are not to be construed as limiting the invention.

The embodiments of the invention in which an exclusive property or privilege is claimed are defined as follows:

1. In a vehicular propulsion system: a vehicle adapted for travel over a roadway, a linear motor for propelling the vehicle and including field producing and field reactive elements, one of said elements being carried by the vehicle and the other of said elements being disposed in discontinuous portions along the roadway, said elements being maintained in adjacent but spaced relation to produce a thrust on said vehicle in proportion to the projected area coextension of said elements, the length of said one element and the spacing between said other discontinuous element portions being such that the area of projected surface coextension between said elements and the thrust on said vehicle is constant irrespective of the position of the vehicle longitudinally along to the roadway as said vehicle travels over a length of roadway which is great as compared to the length of said one element.

2. A system as defined in claim 1 wherein the length of said one element is equal to the distance between the longitudinal centers of discontinuous element portions.

3. A system as defined in claim 2 wherein the discontinuous element portions are of equal length and spacing.

4. A system as defined in claim 3 wherein the field reactive element is disposed in said discontinuous portions along the roadway.

5. A system as defined in claim 4 including a power source disposed substantially continuously along the roadway and means carried by the vehicle for variably interconnecting the source to the field producing element.

6. A system as defined in claim 4 including air support means on the vehicle for substantially frictionlessly supporting the vehicle relative to the roadway.

7. A system as defined in claim 2 wherein the field reactive element is disposed on the vehicle.

8. A system as defined in claim 7 including air support means on the vehicle for supporting the vehicle relative to the roadway.

* * * * *